United States Patent
Rodricks et al.

(10) Patent No.: US 6,350,985 B1
(45) Date of Patent: Feb. 26, 2002

(54) METHOD FOR CALCULATING GAIN CORRECTION FACTORS IN A DIGITAL IMAGING SYSTEM

(75) Inventors: Brian Rodricks, Newark; Michael Hoffberg, Bear, both of DE (US); Cornell Williams, Pennsauken, NJ (US)

(73) Assignee: Direct Radiography Corp., Newark, DE (US)

( * ) Notice: Subject to any disclaimer, the term of this patent is extended or adjusted under 35 U.S.C. 154(b) by 0 days.

(21) Appl. No.: 09/299,316

(22) Filed: Apr. 26, 1999

(51) Int. Cl.[7] ............................................. G12B 13/00
(52) U.S. Cl. ........................... 250/252.1; 250/363.09; 250/339.09; 250/341.5
(58) Field of Search ..................... 250/252.1, 363.09, 250/339.09, 341.5, 370.08, 370.09

(56) References Cited

U.S. PATENT DOCUMENTS

| | | | |
|---|---|---|---|
| 4,602,291 A | 7/1986 | Temes | 358/221 |
| 4,694,342 A | 9/1987 | Klees | 358/167 |
| 4,731,865 A | 3/1988 | Sievenpiper | 382/54 |
| 4,736,439 A | 4/1988 | May | 382/54 |
| 4,920,428 A | 4/1990 | Lin et al. | 358/461 |
| 5,047,861 A * | 9/1991 | Houchin et al. | 348/247 |
| 5,254,480 A | 10/1993 | Tran | 437/2 |
| 5,302,824 A | 4/1994 | Prager | 250/252.1 |
| 5,315,101 A | 5/1994 | Hughes et al. | 250/208.1 |
| 5,340,988 A | 8/1994 | Kingsley et al. | 250/370.09 |
| 5,381,014 A | 1/1995 | Jeromin et al. | 250/370.09 |
| 5,384,865 A | 1/1995 | Loveridge | 382/54 |
| 5,390,264 A | 2/1995 | Ishihara et al. | 382/54 |
| 5,525,794 A | 6/1996 | Gibbons | 250/207 |
| 5,648,660 A | 7/1997 | Lee et al. | 250/370.09 |
| 5,689,116 A | 11/1997 | Heukensfeldt Jansen | 250/363.09 |
| 5,773,832 A | 6/1998 | Sayed et al. | 250/370.09 |
| 5,804,832 A | 9/1998 | Crowell et al. | 250/580 |
| 5,832,055 A | 11/1998 | Dewaele | 378/62 |
| 5,925,880 A | 7/1999 | Young et al. | 250/252.1 |

* cited by examiner

Primary Examiner—Seungsook Ham
Assistant Examiner—Shun Lee
(74) Attorney, Agent, or Firm—Ratner & Prestia

(57) ABSTRACT

A method for developing a set of gain correction coefficients corrected for structural noise to be used in correcting the digital values representing an image captured by a pixelated detector having a plurality of individual sensors. The gain correction coefficients are developed by first obtaining a first set gain correction coefficients using a flat exposure and adjusting the individual sensor gain output so that all sensors produce the same output value, and then applying a smoothing filter to the first set of gain correction coefficients to obtain a new set of corrected gain correction coefficients.

12 Claims, 1 Drawing Sheet

METHOD FOR CALCULATING GAIN CORRECTION FACTORS IN A DIGITAL IMAGING SYSTEM

TECHNICAL FIELD

This invention relates to a method for calculating gain correction factors in a digital imaging system and more particularly to a method for reducing fixed pattern structural noise in gain equalization factor calculations.

BACKGROUND OF THE INVENTION

Large size image detectors are well known in the art as exemplified by U.S. Pat. No. 5,773,832, issued Jun. 30, 1998 to Sayed et al., U.S. Pat. No. 5,254,480, issued Oct. 19, 1993 to Nang T. Tran, U.S. Pat. No. 5,315,101, issued May 24, 1994 to Hughes et al. or U.S. Pat. No. 5,381,014, issued Jan. 10, 1995 to Jeromin et al.

These detectors typically comprise arrays of millions of individual sensors which output an electrical signal representing the radiation exposure of the sensor, and whose combined output represents the image projected by the exposing radiation onto the detector. The output of each sensor represents one picture element (pixel) of the captured image.

The current state of the art in manufacturing such detectors, while extremely advanced, has not been able to produce detectors in which the individual sensors respond exactly the same to an exposure level. Thus when a detector is illuminated with uniform intensity radiation, the output of the individual sensors is not, as one would expect, uniform. To the contrary, the output varies from pixel to pixel. In addition the gain of each amplifier in the readout system also varies between amplifiers.

The art has addressed this problem by calculating a gain correction coefficient for each pixel such that when the output of each pixel is processed (usually multiplied) by this coefficient, the output of all pixels is uniform for a uniform exposure. These individual gain correction coefficients are usually stored in a table (i.e. a Look Up Table or LUT) and are used to correct the values obtained for each pixel when the detector is subsequently used to detect an image.

The problem with this approach, however, is that the output non-uniformity in the uniform exposure signal used to calculate the gain correction coefficients is not solely due to sensors output differences. Before the signal can be digitized and made available for processing, it undergoes detection and amplification in analog form followed by A to D conversion in various electronic components. Thus the output signal contains, in addition to the actual sensor output non-uniformities, noise from the electronic components handling the signal, including the amplification and digitization stages. This noise is random and not expected to repeat between exposures. Thus correcting the output of subsequent images with a coefficient calculated for a single exposure introduces noise which distorts the image.

Another source of error in the calculation of the gain correction coefficients is the uniform illumination used to obtain the uniform (also known as flat field) exposure of the detector in the first place. It is extremely hard to create a perfectly uniform radiation field over a large surface, especially when the radiation is x-ray radiation and the detector is a large 14×17 inch detector typically used in digital radiography for medical diagnostic purposes. While this problem could be corrected out, unfortunately the illumination also varies between exposures adding to the source of unpredictable noise.

In this application, we will refer to the above sources of non-uniformity in the sensors output collectively as structural noise.

The solution adopted by the prior art has been to generate a multiplicity of gain correction factors from a plurality of distinct flat field exposures of the detector and average the gain factors for each pixel to obtain an average gain factor thus eliminating to a large degree the random noise errors.

While this process is effective, it is also time consuming and therefore expensive. This is particularly undesirable because the gain factors should be checked often to correct the LUT to compensate for aging of the sensors or for changes in the environment where the detector operates.

There is, therefore, still a need to develop a process for calculating an accurate gain factor for each pixel of a detector having a plurality of sensors quickly and easily, without requiring multiple exposures of the sensor.

SUMMARY OF THE INVENTION

In accordance with this invention, the aforementioned problems are alleviated through a method for developing a set of corrected digital gain correction coefficients for use in correcting digital values representing an image captured by a detector comprising a plurality of individual sensors, each sensor representing a pixel, the method comprising:

A) exposing the detector to radiation having a substantially uniform intensity distribution over all sensors to obtain an initial set of pixel values;

B) developing a first set of gain correction coefficients; and

C) applying a smoothing filter to said first set of gain correction coefficients to obtain a set of corrected gain correction coefficients.

Applying a smoothing filter may comprise identifying a filter window comprising a plurality of pixels surrounding and including a target pixel and calculating a corrected gain correction coefficient using only the gain correction coefficients in said filter window.

The calculation of the corrected gain correction coefficient for the target pixel may, for example, comprise comparing the coefficient values of the first set of gain correction coefficients for the plurality of pixels in the filter window, and obtaining a mean value which is used as the corrected gain correction coefficient for the target sensor.

The present invention also provides a method for correcting an image for structural noise in the output of a plurality of radiation detection sensors forming a detector, each of said sensors representing a pixel and comprising a radiation detection conversion element, and signal processing electronic circuitry for producing a digital output representing the radiation exposure of each of said sensors, the method comprising in the following order.

1. Exposing the plurality of sensors to a substantially uniform intensity radiation;
2. Obtaining a pixel digital output value from each of said plurality of sensors;
3. Calculating a median value of the of all of said pixel digital output values;
4. Calculating for each pixel a first gain coefficient equal to the ratio of the pixel digital output value to the median value;
5. Applying a smoothing filter to said first gain correction coefficients to obtain a set of corrected gain correction coefficients.
6. Storing the corrected gain correction coefficients in a look up table and 7. Using said corrected gain correction coefficients to correct an image captured by the detector.

DETAILED DESCRIPTION OF INVENTION

Figure 1:
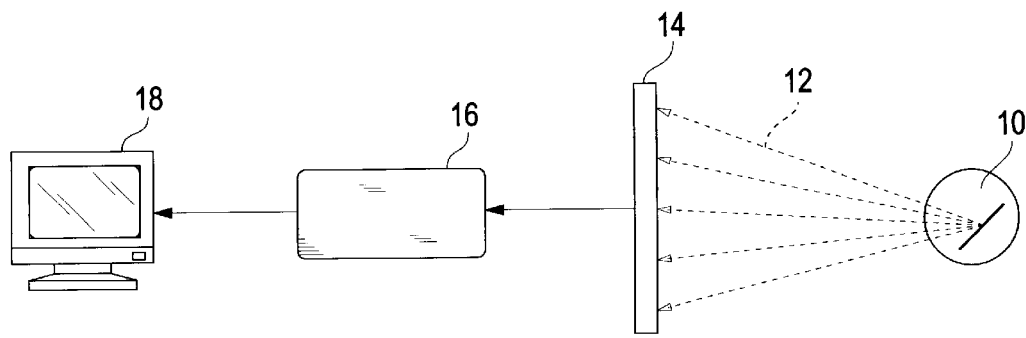
FIG. 1 shows a schematic representation of a radiation source, radiation detector, image processor and image display.

The invention will next be illustrated with reference to the figures wherein similar numbers indicate the same elements in all figures. Such figures are intended to be illustrative rather than limiting and are included herewith to facilitate the explanation of the process of the present invention.

While this invention will be described with reference to a specific radiation detection panel, it is understood that it is equally applicable to any electronic panel having a plurality of radiation detection elements capable of capturing an image and producing a digital output representing the captured image.

A preferred detector contemplated for use in the present invention is a direct conversion radiation detector of the type disclosed in U.S. Pat. No. 5,498,880 by Lee et al. and assigned to the assignee of the present invention. As disclosed in this patent the detector comprises a two dimensional array of individual radiation sensors on a supporting dielectric base forming a panel of appropriate size, preferably 14 by 17 inches. The sensors each comprise a charge storage capacitor and a switching transistor adjacent the capacitor. Conductive lines extend in the spaces between sensors. The source and gate electrodes of the switching transistors are connected to the conductive lines along individual columns and rows.

A photoconductive layer is placed over the individual sensors and a biasing electrode is placed over the photoconductive layer. Charge blocking layers may be placed on one or both sides of the photoconductive layer. Upon exposure to radiation, electron and hole pairs are freed in the photoconductive layer. Under an imposed static magnetic field, electrons migrate to the biasing electrode and holes to the charge storage capacitor (depending on the polarity of the applied field).

The panel is enclosed in an enclosure such as disclosed in U.S. Pat. No. 5,804,832 issued to Crowell et al. and also assigned to the assignee of the present invention.

Following exposure to radiation, the biasing field is removed and the accumulated charge in the individual sensors is read out, amplified, digitized and stored. The panel is next reconditioned for the next exposure, by exposing to illuminating radiation as disclosed in U.S. Pat. No. 5,563,421, issued to Lee et al. and again assigned to the assignee of the present invention. Preferably between exposures, the radiation detection panel is continuously cycled between a state where the biasing voltage is zero and a state where a biasing voltage other than zero is applied to the biasing electrode, followed by image readout even when no exposure has occurred. This is referred to as the standby state, as distinguished from the ready state in which the cycling has been interrupted and a proper biasing voltage has been applied to the sensors.

A more detailed description of the operation of a radiation detection sensor of this type will be found in the aforementioned U.S. Pat. No. 5,648,660 issued to Lee et al. and assigned to assignee of the present invention.

FIG. 1 shows a typical system where the gain control method of the present invention may be used. The system comprises a source 10 of a beam of substantially uniform intensity imaging radiation 12, which in medical diagnostic applications is x-rays.

The radiation is focussed to impinge onto a radiation detector 14. The detector 14 produces a digital raw image signal that is processed in a digital data processor 16 and displayed in an image display 18, such as a high resolution CRT. The display may also be a hard copy in which case the display 18 may be a hard copy printer.

Figure 2:
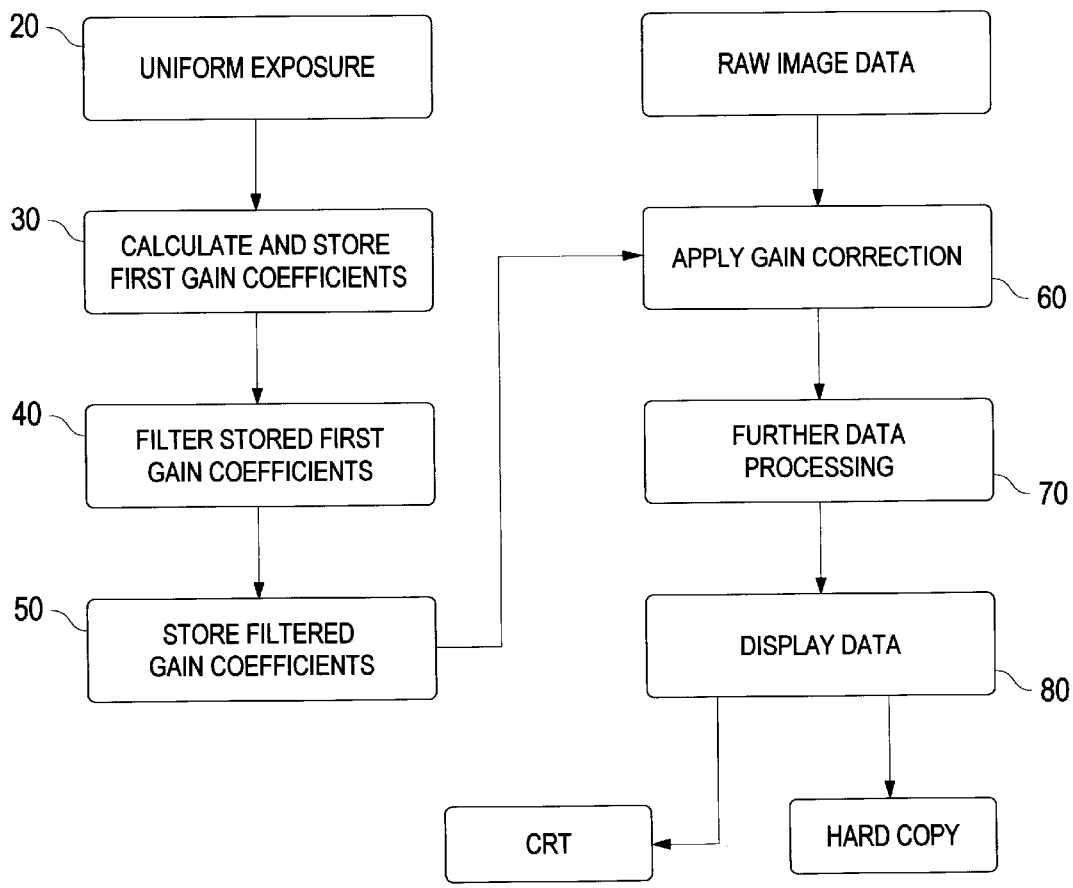
FIG. 2 shows a flow diagram of the process of the present invention.

FIG. 2 illustrates the method steps according to the present invention which are implemented to generate a LUT of corrected gain coefficients for use in displaying an image.

As illustrated, the first step 20 consists of exposing detector 14 to a uniform intensity radiation for a preselected time. Preferably, the exposure time selection is such as to produce a low image density.

Once the digital output of the detector 14 has been obtained it is stored in a memory in image processor 16. This digital output is pixel data representing the individual sensor output of the panel when all sensors have been exposed to substantially uniform radiation levels.

Step 30 is performed using this flat field exposure data. Step 30 involves the calculation of a set of first gain coefficients such that when the flat field exposure output of each pixel is multiplied by the corresponding gain correction coefficient derived for this pixel, all pixels will have the same digital value, representing a uniform exposure image. Thus there is first developed a set of first gain coefficients such set comprising a gain coefficient for each sensor of the detector array of sensors.

Derivation of this first set of gain correction coefficients is well known in the art. A preferred way is to obtain the mean value of all the pixel values by adding all the pixel values and dividing by the number of pixels. The mean value is then divided into each pixel value to generate a correction coefficient for this pixel. In an alternate embodiment the first calculation of the gain correction coefficients prior to the application of a smoothing filter may be done using a median value rather than the mean value. These correction coefficients are then stored into a buffer memory as shown in step 30.

Next, according to the present invention, the coefficients, referred to hereinafter as the first gain correction coefficients, are subjected to a smoothing filter 40, to obtain a second set of gain correction coefficients which will be referred to hereinafter as the corrected gain coefficients. In a preferred embodiment, the gain correction coefficients obtained prior to the application of the smoothing filter, may be the result of averaging a plurality of gain correction coefficients obtained following a plurality of flat exposures. There is a corrected gain coefficient derived for each of the detector sensors.

The corrected gain coefficients are stored in step 50 in a look up table (LUT) for use in correcting the raw data output of detector 14 when used in capturing an actual radiographic image.

There is a correction coefficient for each pixel of the detector array and thus an array of gain correction coefficients corresponding to the sensor array in the detector. The smoothing filter is applied to this gain correction coefficient array and can be any smoothing filter. A preferred smoothing filter consists of a 5×5 window of pixel gain correction coefficients surrounding the target gain correction coefficient. The highest and the lowest coefficient values within the window are discarded and the median value of the remaining coefficient values is determined. This value is used to replace the target gain correction coefficient.

EXAMPLE

Assume the following flat field exposure data received from a detector:

$F_{11}$ $F_{12}$ $F_{13}$ ... $F_{1,(i-3)}$ $F_{1,(i-2)}$ $F_{1,(i-1)}$ $F_{1,i}$ $F_{21}$ $F_{22}$ $F_{23}$ ... $F_{2,(i-3)}$ $F_{2,(i-2)}$ $F_{2,(i-1)}$ $F_{2,i}$ $F_{j1}$ $F_{j2}$ $F_{j3}$ ... $F_{j,(i-1)}$ $F_{j,i}$

The mean of this data set is $M=\Sigma F_{j,i}/i*j$. Using the mean M we next calculate the first gain correction coefficients $GC_{1(i,j)}$ $$GC_{1(i,j)}=F_{j,i}/M$$

And form the $GC_{1(i,j)}$ array: which is stored in a buffer memory.

$GC1_{(1,1)}$ $GC1_{(1,2)}$ ... $GC1_{(1,i-1)}$ $GC1_{(1,i)}$ $GC1_{(2,1)}$ $GC1_{(2,2)}$ ... $GC1_{(2,i-1)}$ $GC1_{(2,i)}$

...

$GC1_{(j,1)}$ $GC1_{(j,2)}$ ... $GC1_{(j,i-1)}$ $GC1_{(j,i)}$

This array is now filtered using the following filter window: For a $GC1_{m,n}$ use the following 25 GC1m,n.

$GC1_{m-2,n-2}$ ... $GC1_{m+2,n-2}$

... GC1m,n ...

$GC1_{m-2,n+2}$ ... $GC1_{m+2,n+2}$

Examine the GC1 values within the window and discard the highest and the lowest value, then obtain the mean of the remaining and use it to replace $GC1_{m,n}$. This mean value is the corrected gain coefficient $CGC_{m,n}$ for the pixel $F_{m,n}$.

The process is repeated using the stored CG1 values for all CG1 values to create a LUT containing all corrected gain coefficients $CGC_{j,i}$ for the detector.

The corrected gain coefficient may be derived using other smoothing filtering methods. For instance, there is nothing special in the selection of a 5×5 pixel neighborhood to form the filter window. Any convenient number of sensors in the vicinity of the target sensor may be used to form the filter window. Similarly, the use of the gain correction coefficients in the filter window to derive the corrected gain correction coefficient may be different than described above. For example, the determination of the highest and lowest coefficient values in the filter window and subsequent exclusion of these values from the calculation of the corrected gain coefficient for the target pixel is not essential and these values may be included in such calculation. Additionally one may use a mean value of the gain coefficients within the window, or one may use a median value. The coefficients may also be used together with a weighing factor dependent, for instance, on the distance of each pixel from the target pixel.

The detector may be used to obtain a radiogram in an actual imaging exposure. In such case, an object (not shown) is placed in the path of the radiation beam 12 between the radiation source 10 and the detector 14. The radiation, in passing through the object, is modulated imagewise in its intensity prior to impinging on the detector. As a result of the exposure of the detector to the imagewise modulated radiation, the detector outputs image data as a digital output. At this stage, this is referred to as raw image data. The raw image data is subjected to a gain correction in step 60. The corrected for gain non-uniformity data is next further processed typically for bad pixel replacement or any other image processing desired in step 70 and displayed either as a soft display in a CRT or printed on paper or film using a printer, as shown in step 80.

As mentioned earlier, gain non-uniformity due to variations in the amplifier performance in the detection stage is also contributing to the structural noise.

A typical radiation detector comprises millions of individual sensors arrayed in rows and columns. These sensors are connected to a plurality of amplifiers, typically one amplifier to each row. The amplifiers themselves are on chips, usually 128 amplifiers per chip. Thus there are 128 rows corresponding to each chip. In a preferred embodiment, the smoothing filter rather than being applied to the full array of gain correction coefficients is applied to sub-arrays of the gain correction coefficients. Such sub-arrays preferably comprise all coefficients corresponding to all sensors connected to the amplifiers of one chip. The window is then limited to only gain coefficients within a single sub-array, and does not bridge to adjacent sub-arrays. The smoothing action is then done for each sub-array corresponding to each chip.

Implementation of the method of this invention is best done using an appropriately programmed computer comprising a CPU and a memory. Programming of the computer is preferably done using an article of manufacture readable by the computer such as magnetic disk or tape, programmed EPROM, CD ROM, or other program storage device in which there is embedded a code which implements the above steps.

Those skilled in the art having the benefit of the teachings of the present invention as hereinabove set forth, can effect numerous modifications thereto. These modifications are to be construed as being encompassed within the scope of the present invention as set forth in a the appended claims where the following is claimed:

What is claimed is:

1. A method for developing a set of corrected digital gain correction coefficients for use in correcting digital values representing an image captured by a detector comprising a plurality of individual sensors, each sensor representing a pixel, the method comprising:
   A) exposing the detector to radiation having a substantially uniform intensity distribution over all sensors to obtain an initial set of pixel values;
   B) developing a first set of gain correction coefficients; and
   C) applying a smoothing filter to all coefficients in said first set of gain correction coefficients to obtain a-set of corrected gain correction coefficients.

2. The method according to claim 1 further comprising the step:
   D) storing said set of corrected gain correction coefficients in a Look Up Table.

3. The method according to claim 1 wherein the step of applying a smoothing filter comprises:
   identifying a filter window comprising a plurality of sensors in the vicinity of a target pixel and calculating a corrected gain coefficient using only the gain coefficients within the filter window.

4. The method according to claim 1 wherein the step of applying a smoothing filter comprises:
   identifying a filter window comprising a plurality of sensors in the vicinity of a target sensor and including the target sensor, each of said target sensors having one of said first set of gain correction coefficients; and
   averaging the coefficient values of said first set of gain correction coefficients for said plurality of sensors of said filter window to obtain an average gain correction coefficient value and replacing said one of said first set of gain correction coefficients for said target sensor with said average gain correction coefficient value.

5. The method according to claim 1 wherein the step of applying a smoothing filter comprises:

identifiing a filter window comprising a plurality of sensors in the vicinity of a target sensor and including the target sensor, each of said target sensors having one of said first set of gain correction coefficients;

comparing the coefficient values of said first set of gain correction coefficients for said filter window, determining a highest and a lowest gain correction coefficient value and discarding said highest and said lowest of said values; and averaging the coefficient values of said first set of gain correction coefficients for said plurality of sensors of said filter window other than the discarded values to obtain an average gain correction coefficient value and replacing said one of said first set of gain correction coefficients for said target sensor with said average gain correction coefficient value.

6. The method according to claim 1 wherein the step of applying a smoothing filter comprises:

dividing the first set of gain correction coefficients into subsets of gain correction coefficients;

for each of the subsets, identifying a filter window comprising a plurality of sensors in the vicinity of a target pixel, said filter window confined within each of said subsets, and calculating a corrected gain coefficient using only the gain coefficients within the filter window.

7. A method for correcting an image for structural noise in the output of a plurality of radiation detection sensors forming a detector, each of said sensors representing a pixel and comprising a radiation detection conversion element, the detector also comprising signal processing electronic circuitry for producing a digital output representing the radiation exposure of each of said sensors, the method comprising in the following order:

A) exposing the plurality of sensors to a substantially uniform intensity radiation;

B) obtaining a digital output pixel value from each of said plurality of sensors;

C) calculating a median value of the of all of said pixel values;

D) calculating and storing for each pixel a first gain coefficient equal to the ratio of the pixel value to the median value to form a first set of gain coefficients;

E) applying a smoothing filter to all coefficients in the first set of gain coefficients to obtain a corrected set of gain coefficients;

F) storing said corrected set of gain coefficients.

8. The method according to claim 7 wherein in step E, applying a smoothing filter comprises:

identifying a filter window comprising a plurality of sensors in the vicinity of a target sensor and including the target sensor, each of said target sensors having one of said first set of gain correction coefficients;

comparing the coefficient values of said first set of gain correction coefficients for said filter window, determining a highest and a lowest gain correction coefficient value and discarding said highest and said lowest of said values; and averaging the coefficient values of said first set of gain correction coefficients for said plurality of sensors of said filter window other than the discarded values to obtain an average gain correction coefficient value and replacing said one of said first set of gain correction coefficients for said target sensor with said average gain correction coefficient value.

9. The method according to claim 7 wherein the step of storing the gain correction coefficients comprises storing the corrected gain correction coefficients in a look up table.

10. The method according to claim 9 further comprising, following step F, exposing the detector to imagewise modulate radiation and applying the stored corrected gain correction coefficients to correct an image data output from the detector resulting from the detector exposure to said imagewise modulated radiation.

11. An article of manufacture comprising:

a computer useable medium having computer readable program code means embodied therein causing the correction of gain correction coefficients used in radiation detector comprising a plurality of radiation sensors each sensor representing a pixel, to correct the detector output for non uniformity in the output of the sensors when exposed to substantially uniform radiation the computer readable means in said article of manufacture comprising:

A) obtaining a set of pixel values resulting from exposing the detector to radiation having a substantially uniform intensity distribution over all sensors;

B) calculating a first set of gain correction coefficients from said set of pixel values;

C) applying a smoothing filter to all coefficients in said first set of gain correction coefficients to obtain a set of corrected gain correction coefficients; and D) storing said set of corrected gain correction coefficients in a memory.

12. A program storage device readable by a machine, tangibly embodying a program of instructions executable by the machine to perform the method steps for correcting a plurality of gain correction coefficients used to correct non uniform sensor response in a radiation detector comprising a plurality of radiation sensors, the method comprising:

A) obtaining a set of pixel values resulting from exposing the detector to radiation having a substantially uniform intensity distribution over all sensors;

B) calculating a first set of gain correction coefficients from said set of pixel values;

C) applying a smoothing filter to all coefficients in said first set of gain correction coefficients to obtain a set of corrected gain correction coefficients; and D) storing said set of corrected gain correction coefficients in a memory.

* * * * *